(No Model.)
R. MANNESMANN.
FLEXIBLE COUPLING FOR SHAFTING.
No. 540,749. Patented June 11, 1895.
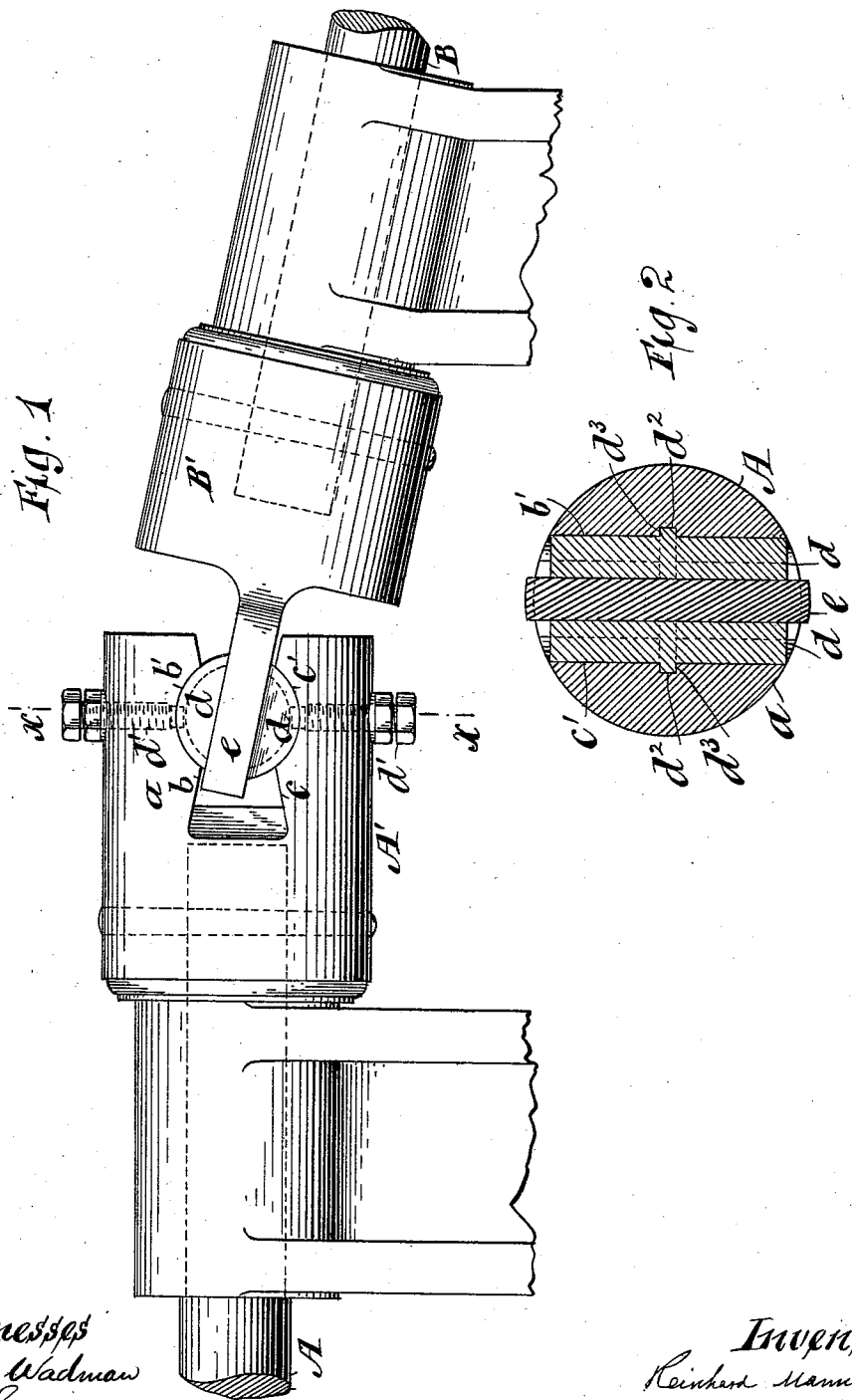
Witnesses
Geo. Wadman
E. Gatterer.
Inventor
Reinhard Mannesmann
Per Edw. E. Leumby
Atty.

UNITED STATES PATENT OFFICE.

REINHARD MANNESMANN, OF REMSCHEID, GERMANY.

FLEXIBLE COUPLING FOR SHAFTING.

SPECIFICATION forming part of Letters Patent No. 540,749, dated June 11, 1895.

Application filed November 10, 1894. Serial No. 528,371. (No model.)

*To all whom it may concern:*

Be it known that I, REINHARD MANNESMANN, of Remscheid, Germany, have invented certain Improvements in Flexible Couplings for Shafting, of which the following is a specification.

This invention relates to a slight modification of the flexible coupling for shafting described and claimed in Max Mannesmann's pending application, Serial No. 514,284, filed June 12, 1894.

The object of the present invention is to simplify the said flexible coupling for employment in coupling two adjacent lengths of shafting which do not extensively depart from common longitudinal alignment.

The present invention consists of a bifurcated head affixed to the end of one length of shafting, the opposed faces of the jaws of said head being provided with raised seats affording the bearings for segments of cylinders adapted to rock in said seats, in combination with a flat blade extending between, and bearing with a sliding fit upon, the opposed flat faces of said segments, and united to or formed integrally with either the end of an adjacent length of shafting, or with a head affixed thereto.

The accompanying drawings of a shaft coupling embodying the invention are as follows:

Figure 1 is an elevation showing the opening between the jaws of the bifurcated head and affording an edge view of the coupling-blade and end views of the segments of cylinders, which afford the lateral bearings for the coupling-blade. Fig. 2 is a transverse section taken through a plane corresponding to that indicated by the dotted line $x\,x$ on Fig. 1 and illustrating a modification in the method of retaining the segments of cylinders in their bearings when the parts are assembled.

The drawings represent the adjacent portions of two lengths of shafting, one of which, A, is provided with the bifurcated head A'. The head is composed of a cylindrically recessed hub, $a$, adapted to receive the end portion of the adjacent length of shafting to which it is keyed, pinned or otherwise secured. The opposed faces of the jaws, $b$ and $c$, are provided with raised transverse seats, $b'\,c'$, presenting round bottomed bearings for two segments of cylinders, $d\,d$, each of which may have on its curved surface a concentric groove adapted to engage the inner end of a screw-bolt, $d'$, inserted through the adjacent jaw, as indicated in dotted lines in Fig. 1, or the segments may each be provided with a concentric rib, $d^2$, adapted to be seated in the concentric grooves, $d^3$, as shown in Fig. 2. The end of the other length, B, of shafting has formed integrally with it or with a head, B', affixed to it, the coupling blade, $e$, the end portion of which extends between, and bears with a loose sliding fit upon, the opposed faces of the segments of cylinders, $d\,d$.

In order to afford clearance for the sides of the blade, $e$, during the rotation of the coupling, the flat faces of the segments of cylinders, $d\,d$, project from the seats, $b'\,c'$, and the opposed faces of the jaws, $b\,c$, diverge each way from the edges of the raised seats, as shown in Fig. 1.

As the described device may obviously be employed for coupling many kinds of rotating objects for the purpose of transmitting motion from one to another and is hence applicable, for instance, for connecting adjacent systems of rolls in a rolling mill or for connecting the axle of a dynamo with the axle of its motor, it is to be understood that the expression, length of shafting, is herein used in a broad sense and that the invention is not limited to connecting adjacent lengths of line shafting, but is present when the described device is used for coupling any rotating objects.

What is claimed as the invention is—

In a shaft coupling substantially as herein shown and described, a length of shafting provided at one of its ends with a bifurcated head having raised transverse seats formed upon the opposed faces of its jaws, two segments of cylinders adapted to rock in said seats, but having their flat faces projecting therefrom, in combination with a coupling blade rigidly connected to and rotating with an adjacent length of shafting and extending between and bearing with a sliding fit upon the opposed flat faces of said segments of cylinders.

REINHARD MANNESMANN.

Witnesses:
A. M. JONES,
E. GATTERER.